(12) United States Patent
Reams

(10) Patent No.: US 10,198,066 B2
(45) Date of Patent: *Feb. 5, 2019

(54) REDUCTION OF POWER CONSUMPTION IN REMOTE CONTROL ELECTRONICS

(71) Applicant: DISH Technologies L.L.C., Englewood, CO (US)

(72) Inventor: William R. Reams, Englewood, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/342,653

(22) Filed: Nov. 3, 2016

(65) Prior Publication Data

US 2017/0075413 A1 Mar. 16, 2017

Related U.S. Application Data

(63) Continuation of application No. 12/056,819, filed on Mar. 27, 2008, now Pat. No. 9,520,743.

(51) Int. Cl.
*G06F 1/32* (2006.01)
*G06F 3/0346* (2013.01)
(Continued)

(52) U.S. Cl.
CPC .......... *G06F 1/3296* (2013.01); *G06F 1/3203* (2013.01); *G06F 1/3231* (2013.01);
(Continued)

(58) Field of Classification Search
CPC ........ G06F 1/3203; G06F 1/3231; G06F 1/32; G06F 1/3215; G06F 1/3287; G06F 1/3296; G06F 3/0346; Y02D 10/173; Y02D 10/155; Y02D 50/20; H03K 2217/960775; G08C 17/02; G08C 2201/12; G08C 2201/32; H04N 2005/443; H04N 2005/4441; H04N 21/42222; H04N 21/42228; H04N 5/4403; H02J 9/005
(Continued)

(56) References Cited

U.S. PATENT DOCUMENTS 4,067,000 A   1/1978  Carlson
4,231,026 A  10/1980  Sullivan
(Continued)

FOREIGN PATENT DOCUMENTS

CA        2191632 A1    8/1997
EP      1 341 316 A2    9/2003
(Continued)

OTHER PUBLICATIONS

Osoinach, "Proximity Capacitive Sensor Technology for Touch Sensing Applications," Proximity Sensing White Paper, Freescale Semiconductor, Inc., 2008, 12 pages.

*Primary Examiner* — Muhammad N Edun
*Assistant Examiner* — Jerold Murphy
(74) *Attorney, Agent, or Firm* — Seed IP Law Group LLP

(57) ABSTRACT

A remote controlling device is disclosed that includes one or more motion sensors configured to sense a motion of the device. The remote control further includes a capacitive sensor and a power source. The capacitive sensor selectively couples the power source to the one or more motion sensors.

18 Claims, 6 Drawing Sheets

(51) Int. Cl.
*H02J 9/00* (2006.01)
*G08C 17/02* (2006.01)

(52) U.S. Cl.
CPC .......... *G06F 1/3259* (2013.01); *G06F 3/0346* (2013.01); *G08C 17/02* (2013.01); *H02J 9/005* (2013.01); *G08C 2201/12* (2013.01); *G08C 2201/32* (2013.01); *Y02D 10/155* (2018.01); *Y02D 10/173* (2018.01); *Y02D 50/20* (2018.01)

(58) Field of Classification Search
USPC .......... 341/33, 176; 348/14.05, 34; 200/600; 324/658–724; 400/479.1, 499.1; 361/277
See application file for complete search history.

(56) References Cited

U.S. PATENT DOCUMENTS

| | | | |
|---|---|---|---|
| 4,578,671 A | 3/1986 | Flowers | |
| 4,598,243 A | 7/1986 | Kawakami | |
| 5,115,236 A | 5/1992 | Köhler | |
| 5,164,652 A | 11/1992 | Johnson et al. | |
| 5,204,657 A | 4/1993 | Prosser et al. | |
| 5,294,915 A | 3/1994 | Owen | |
| 5,408,668 A | 4/1995 | Tomai | |
| 5,455,560 A | 10/1995 | Owen | |
| 5,506,572 A | 4/1996 | Hills et al. | |
| 5,519,760 A | 5/1996 | Borkowski et al. | |
| 5,583,491 A | 12/1996 | Kim | |
| 5,598,143 A | 1/1997 | Wentz | |
| 5,638,050 A | 6/1997 | Sacca et al. | |
| 5,649,018 A * | 7/1997 | Gifford | F16F 13/26 381/71.14 |
| 5,684,471 A | 11/1997 | Bernardi et al. | |
| 5,705,997 A | 1/1998 | Park | |
| 5,926,090 A | 7/1999 | Taylor et al. | |
| 5,945,918 A | 8/1999 | McGonigal et al. | |
| 5,963,010 A | 10/1999 | Hayashi et al. | |
| 5,990,868 A | 11/1999 | Frederick | |
| 5,999,799 A | 12/1999 | Hu et al. | |
| 6,002,450 A | 12/1999 | Darbee et al. | |
| 6,094,239 A | 7/2000 | Weber | |
| 6,191,551 B1 | 2/2001 | Fischer et al. | |
| 6,230,277 B1 | 5/2001 | Nakaoka et al. | |
| 6,295,002 B1 | 9/2001 | Fukuda | |
| 6,373,256 B1 | 4/2002 | Hanjani et al. | |
| 6,407,779 B1 | 6/2002 | Herz | |
| 6,449,726 B1 | 9/2002 | Smith | |
| 6,535,125 B2 | 3/2003 | Trivett | |
| 6,573,832 B1 | 6/2003 | Fugere-Ramirez | |
| 6,633,281 B2 | 10/2003 | Lin et al. | |
| 6,639,454 B2 * | 10/2003 | Hoshi | G06F 1/32 327/544 |
| 6,661,410 B2 | 12/2003 | Casebolt et al. | |
| 6,664,744 B2 | 12/2003 | Dietz | |
| 6,725,064 B1 | 4/2004 | Wakamatsu et al. | |
| 6,771,182 B1 | 8/2004 | Loh et al. | |
| 6,791,467 B1 | 9/2004 | Ben-Ze'ev | |
| 6,938,101 B2 | 8/2005 | Hayes et al. | |
| 6,985,069 B2 | 1/2006 | Marmaropoulos | |
| 7,009,528 B2 | 3/2006 | Griep | |
| 7,047,333 B2 | 5/2006 | Leung et al. | |
| 7,072,587 B2 | 7/2006 | Dietz et al. | |
| 7,199,783 B2 * | 4/2007 | Wenstrand | G06F 1/3203 345/156 |
| 7,199,789 B2 | 4/2007 | Endo et al. | |
| 7,362,227 B2 | 4/2008 | Kim | |
| 7,395,717 B2 | 7/2008 | DeAngelis et al. | |
| 7,411,631 B1 | 8/2008 | Joshi et al. | |
| 7,474,248 B2 | 1/2009 | Nakamura et al. | |
| 7,511,602 B2 | 3/2009 | Huntzicker | |
| 7,738,792 B2 | 6/2010 | Flachs et al. | |
| 7,757,105 B2 | 7/2010 | Okazaki | |
| 7,852,255 B2 | 12/2010 | Rapisarda | |
| 9,520,743 B2 * | 12/2016 | Reams | G06F 1/3203 |
| 2002/0071059 A1 | 6/2002 | Furuya et al. | |
| 2002/0085128 A1 | 7/2002 | Stefanik | |
| 2002/0093481 A1 * | 7/2002 | Kehlstadt | G06F 1/3203 345/156 |
| 2002/0126094 A1 * | 9/2002 | Junod | G06F 1/3203 345/163 |
| 2003/0026424 A1 | 2/2003 | McGarrahan et al. | |
| 2003/0035074 A1 | 2/2003 | Dubil et al. | |
| 2003/0058222 A1 | 3/2003 | Casebolt et al. | |
| 2003/0145242 A1 | 7/2003 | Derocher et al. | |
| 2003/0159146 A1 | 8/2003 | Kim | |
| 2004/0095152 A1 * | 5/2004 | Ho | G06F 1/3203 324/686 |
| 2004/0096051 A1 | 5/2004 | Kim et al. | |
| 2004/0148632 A1 | 7/2004 | Park et al. | |
| 2004/0161031 A1 | 8/2004 | Kwentus et al. | |
| 2004/0203374 A1 | 10/2004 | Zilliacus | |
| 2004/0235446 A1 | 11/2004 | Flaherty et al. | |
| 2004/0250273 A1 | 12/2004 | Swix et al. | |
| 2004/0252247 A1 | 12/2004 | Wabiszczewicz | |
| 2005/0033887 A1 | 2/2005 | Kim et al. | |
| 2005/0073497 A1 | 4/2005 | Kim | |
| 2005/0146438 A1 | 7/2005 | Giger et al. | |
| 2005/0248534 A1 | 11/2005 | Kehlstadt | |
| 2006/0017581 A1 | 1/2006 | Schwendinger et al. | |
| 2006/0034611 A1 | 2/2006 | Li | |
| 2006/0081771 A1 | 4/2006 | Eliad Wardimon | |
| 2007/0018845 A1 | 1/2007 | Sutardja | |
| 2007/0021930 A1 | 1/2007 | Uhlik | |
| 2007/0054651 A1 | 3/2007 | Farmer et al. | |
| 2007/0066394 A1 | 3/2007 | Ikeda et al. | |
| 2007/0080823 A1 | 4/2007 | Fu et al. | |
| 2007/0102525 A1 | 5/2007 | Orr et al. | |
| 2007/0128899 A1 | 6/2007 | Mayer | |
| 2007/0130609 A1 | 6/2007 | Han et al. | |
| 2007/0185968 A1 | 8/2007 | White et al. | |
| 2007/0279332 A1 | 12/2007 | Fryer et al. | |
| 2008/0024435 A1 | 1/2008 | Dohta | |
| 2008/0040758 A1 | 2/2008 | Beetcher et al. | |
| 2008/0098426 A1 | 4/2008 | Candelore | |
| 2008/0163049 A1 | 7/2008 | Krampf | |
| 2008/0267435 A1 | 10/2008 | Schumaier | |
| 2008/0312852 A1 | 12/2008 | Maack | |
| 2009/0002218 A1 | 1/2009 | Rigazio et al. | |
| 2009/0007001 A1 * | 1/2009 | Morin | G06F 3/0237 715/773 |
| 2009/0077396 A1 | 3/2009 | Tsai et al. | |
| 2009/0122206 A1 | 5/2009 | Jung | |
| 2009/0174653 A1 | 7/2009 | Shin et al. | |
| 2009/0241052 A1 | 9/2009 | Ha et al. | |
| 2009/0249086 A1 | 10/2009 | Reams | |
| 2009/0262254 A1 | 10/2009 | Reams | |
| 2009/0278701 A1 | 11/2009 | Reams | |
| 2009/0303097 A1 | 12/2009 | Reams et al. | |
| 2009/0305742 A1 * | 12/2009 | Caballero | H04B 1/3838 455/566 |
| 2009/0322583 A1 | 12/2009 | Reams et al. | |
| 2009/0328232 A1 | 12/2009 | Safford, III | |
| 2010/0013551 A1 | 1/2010 | Reams | |
| 2010/0231384 A1 | 9/2010 | Reams | |
| 2011/0163886 A1 | 7/2011 | Reams | |
| 2011/0285540 A1 | 11/2011 | Reams | |
| 2013/0036318 A1 | 2/2013 | Reams | |

FOREIGN PATENT DOCUMENTS

| | | |
|---|---|---|
| EP | 1 617 315 A1 | 1/2006 |
| GB | 2 331 610 A | 5/1999 |
| GB | 2 347 592 A | 9/2000 |
| JP | 1-114298 A | 5/1989 |
| JP | 4-148499 A | 5/1992 |
| JP | 10-334380 A | 12/1998 |
| JP | 2000-130848 A | 5/2000 |
| JP | 2001-268668 A | 9/2001 |
| JP | 2004-92946 A | 3/2004 |
| JP | 2006-20386 A | 1/2006 |
| JP | 2007-251893 A | 9/2007 |

(56) References Cited

FOREIGN PATENT DOCUMENTS

| | | |
|---|---|---|
| JP | 2007-295186 A | 11/2007 |
| JP | 2007-318512 A | 12/2007 |
| JP | 2008-28584 A | 2/2008 |
| JP | 2008-42748 A | 2/2008 |
| TW | 200905526 A | 2/2009 |
| WO | 2007-023737 A2 | 3/2007 |
| WO | 2007-086633 A2 | 8/2007 |
| WO | 2008/146095 A1 | 12/2008 |

* cited by examiner

REDUCTION OF POWER CONSUMPTION IN REMOTE CONTROL ELECTRONICS

CROSS-REFERENCE TO RELATED APPLICATION

This application is a continuation of U.S. patent application Ser. No. 12/056,819, filed Mar. 27, 2008, which is related to U.S. patent application Ser. No. 12/056,520 (now U.S. Pat. No. 8,082,455), entitled "Systems and Methods for Controlling the Power State of Remote Control Electronics," filed on Mar. 27, 2008, all of which are hereby incorporated by reference as if set forth in full below.

FIELD OF THE INVENTION

The present invention relates generally to remote control electronics, and more particularly to an apparatus and method to conserve power consumption of remote control electronics.

BACKGROUND ART

Electronic devices are ubiquitous in society and can be found in everything from toaster ovens to set-top cable boxes. With the proliferation of integrated circuitry, these electronic devices are becoming more and more sophisticated. Many of these electronic devices—especially consumer electronic devices—include the ability to be remotely controlled by a user. The user expects to be able to harness the full functionality of the particular electronic device remotely, and therefore, the remote control electronics are also becoming more and more sophisticated. This increased sophistication of the remote control electronics presents special power consumption problems because the remote control electronics are usually battery powered.

Thus, there is a need for an apparatus and method for reducing power consumption of remote control electronics.

BRIEF SUMMARY

A remote control capable of controlling multiple pieces of remote electronic devices, such as a set-top box receiver, game console or a display screen, is disclosed. The remote control may control remote electronic devices, for example, by actuating buttons on the remote control, or by moving the remote control spatially with respect to the electronic device being controlled.

This remote control implements power saving features that include a capacitive sensor that selectively couples at least certain power consuming elements of the remote control electronics to a power source, which may be batteries. The capacitive sensor selectively couples the power consuming elements to the power source based on whether or not a user is holding the remote control.

One embodiment includes a device further including at least one control interface for controlling an electronic component, at least one power source, one or more motion sensors configured to sense a motion of the device; and a capacitive sensor selectively coupling the one or more batteries to the one or more motion sensors or other elements.

Another embodiment includes a method of operating a wireless remote control device, including the acts of generating one or more signals indicative of the wireless remote control device's motion, transmitting the one or more signals to one or more remote electronic devices, detecting a capacitance, comparing the capacitance to an expected value; and in the event the capacitance is within a range of expected values, entering a low power mode.

Yet another embodiment includes a broadcast receiver system including a set-top box receiver, a remote controlling device further including one or more buttons, one or more batteries, one or more motion sensors configured to indicate a user's movement with respect to a screen; and a capacitive sensor that selectively couples the one or more batteries to the one or more motion sensors.

BRIEF DESCRIPTION OF THE FIGURES

The use of the same reference symbols in different drawings indicates similar or identical items.

DETAILED DESCRIPTION

The following discussion describes various embodiments that may reduce consumption in certain electronic devices. Although one or more of these embodiments may be described in detail, the embodiments disclosed should not be interpreted or otherwise used as limiting the scope of the disclosure, including the claims. In addition, one skilled in the art will understand that the following description has broad application, and the discussion of any embodiment is meant only to be exemplary, and is not intended to intimate that the scope of the disclosure, including the claims, is limited to these embodiments. References to "control interface" should be interpreted as including, but not limited to, buttons, touchpads, switches, and the like.

One embodiment takes the form of an apparatus for reducing power consumption in remote control electronics. The embodiment may include a remote control capable of controlling multiple pieces of remote electronic devices, such as a set-top box receiver or a display screen. Control may be exercised by, for example, actuating buttons on the remote control, contact with a touchpad, or may be through moving the remote control spatially with respect to the electronic device being controlled. For example, the remote control controls the position of objects and/or icons displayed on a display screen by moving the remote control spatially relative to the screen.

The embodiment may further include a capacitive sensor that selectively operationally couples at least certain power consuming elements of the remote control electronics to a power source based on whether a user is holding the remote control. Exemplary portions of the remote control device that may be selectively coupled to and from the power source include gyroscopes, accelerometers, touch pads, data link circuitry and so forth.

Figure 1A:
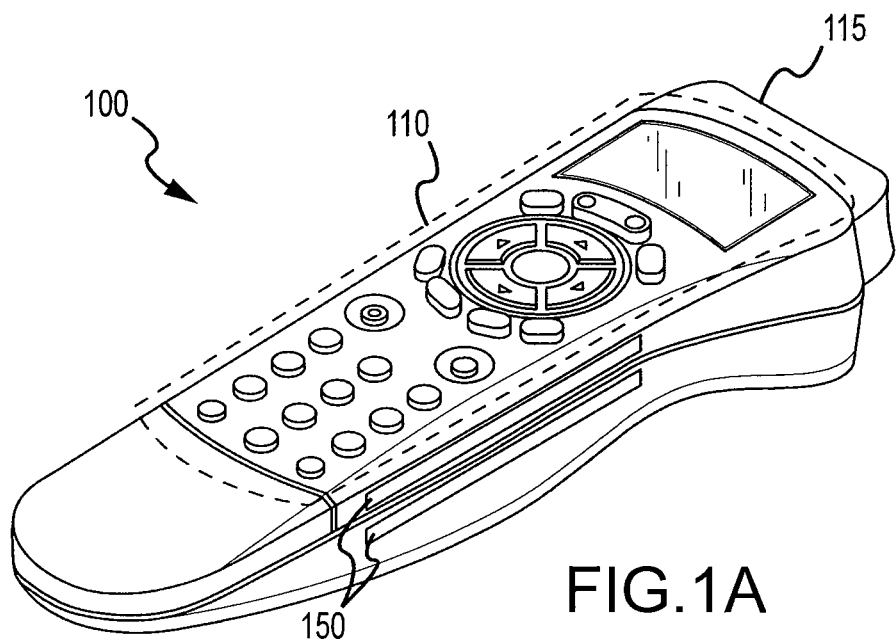
FIG. 1A depicts an oblique view of an exemplary remote control according to one embodiment.
Figure 2:
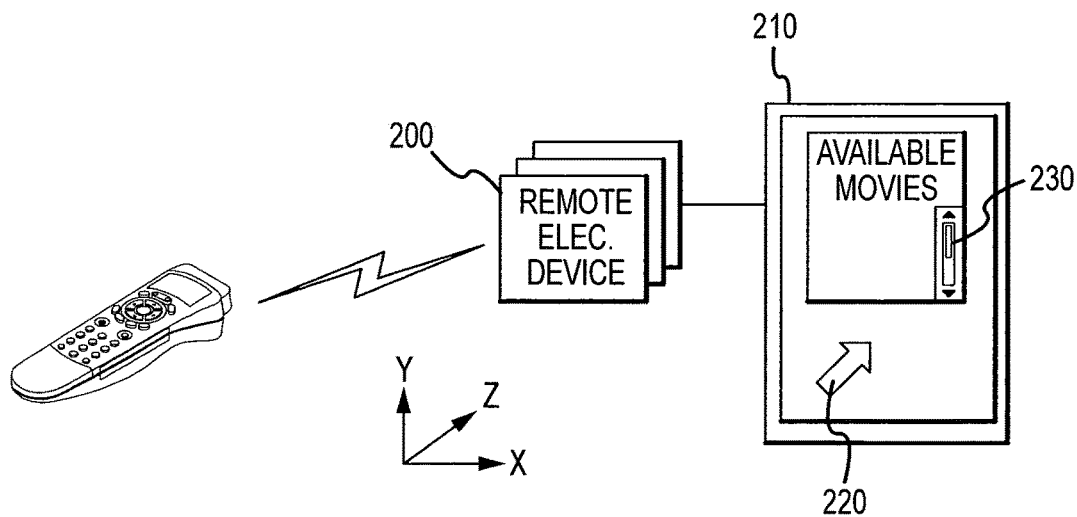
FIG. 2 illustrates the remote control operating one or more exemplary remote electronic devices.

FIG. 1A depicts a top perspective view of an exemplary remote control 100 according to a first embodiment. It should be noted that although the remote control 100 is shown as a single handheld device, other implementations are possible. For example, the remote control 100 may be implemented in the form of a remote keyboard or multiple handheld devices. In any event, the remote control 100 is powered by one or more batteries (not shown) and includes one or more buttons 110. These buttons 110 allow a user of the remote control 100 to activate and deactivate one or more remote electronic devices 200, as shown in FIG. 2. The remote electronic devices 200 that are controllable with the remote control 100 may be any variety of electronics, such as set-top boxes (STBs), TVs, digital video recorders (DVRs) for other receivers used in receiving television programming across any suitable wired or wireless network. One such STB is the ViP722ksu model manufactured by EchoStar Technologies LLC of Englewood, Colo., United States.

The remote control 100 and the remote electronic devices 200 communicate using many different signal types and communication protocols. For example, as shown in FIG. 1A, the remote control 100 may utilize radio frequency (RF), infrared (IR), Bluetooth, ZigBee, EC-Net, etc., transmitters and receivers 115 to communicate with the electronic devices. Exemplary transmit and receive protocols include IEEE 802.15.1 and 802.15.4.

The remote control 100 may be configured to provide the entire functionality of the remote electronic device being controlled. Referring still to the exemplary embodiment shown in FIG. 2, the electronic devices 200 may couple to a television 210. The electronic devices 200 may couple to the television 210 in many ways, both physically and electrically, and that they may be a single unit. Likewise, the electronic devices may operationally couple to another device or, in some embodiments, no device at all. Regardless of their implementation, the television 210 and/or remote devices 200 may be configured to present a user selection menu 220 to the user. User selection menu 220 may be manipulated by the user of the remote control 100 to select various options presented on the television 210. As one example, as shown in FIG. 2, the user selection menu 220 may be used to adjust a slider 230 in order to display different movies available for purchase. In some embodiments, the user selection menu 220 may appear to move not only in the X and Y directions, but also the Z direction. The remote control 100 may use several different mechanisms for controlling the user selection menu 220.

Referring back to FIG. 1A, a touch pad 120 is shown by which a user of the remote control 100 can move the user selection menu 220. Alternatively, as shown in the phantom perspective view of FIG. 1B, the remote control 100 may include one or more gyroscopes 130 and/or accelerometers 140 for detecting a user's movement of the remote control in three dimensions and, consequently, the user's desired movement of the user selection menu 220. Regardless of whether the remote control 100 uses the touch pad 120, the gyroscopes 130, or the accelerometers 140, operating these devices may cause the remote control 100 to draw heavily from its internal power supply (such as a battery). In one embodiment, the remote control 100 includes one or more capacitive sensors 150 that detect whether the remote control 100 is being held by a user and may facilitate adjusting the power consumption of high current consuming circuitry accordingly. In one example, the capacitive sensors 150 are placed along the periphery of the remote control 100 where the user's hands touch the remote control 100, but they may be located anywhere on the remote control 100. FIG. 1C illustrates a top plan view of the remote control 100 showing the capacitive sensors 150 on opposite sides of the remote control 100.

Alternatives to capacitive sensors may be used without departing from the spirit and scope of the disclosure. For example, in some embodiments, inductive or resistive sensors may be used that detect the electrical properties of a user's body by forming an electrical network with the user's body.

Figure 1B:
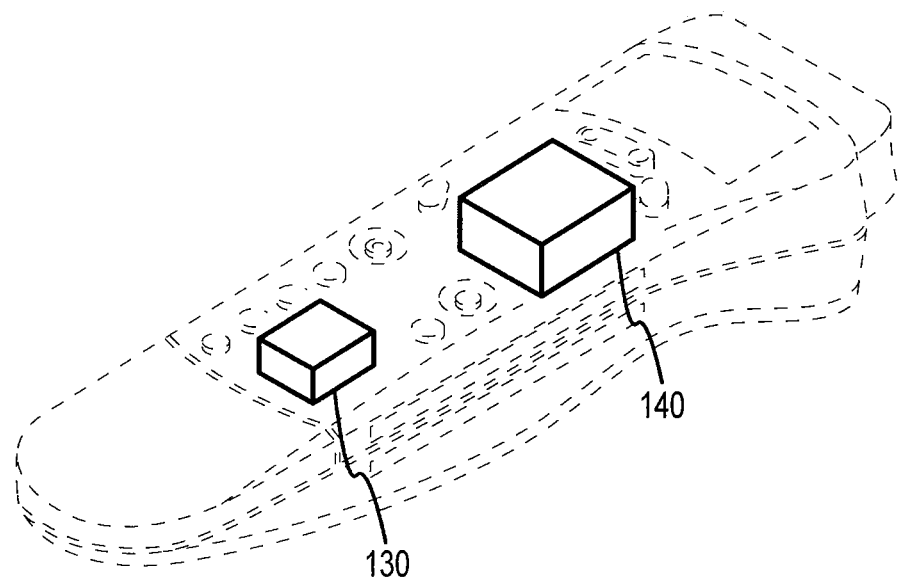
FIG. 1B shows a phantom perspective view of the remote control including additional components.
Figure 1C:
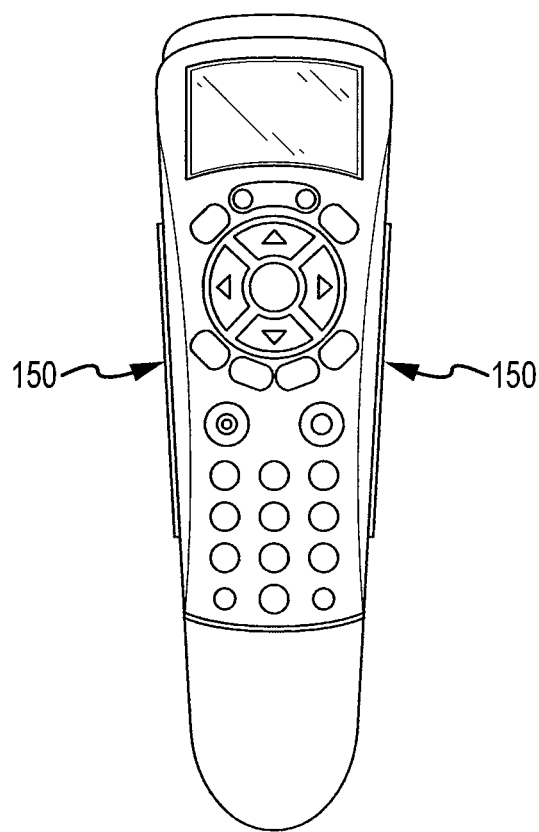
FIG. 1C illustrates a top plan view of the remote control with capacitive sensors.

Similarly, the capacitive sensors may be used on remote devices other than the handheld remote controls depicted in FIG. 1A-1C. For example, instead of being implemented in a handheld remote, the concepts may be applied to head gear or chest straps worn by the user.

Figure 3A:
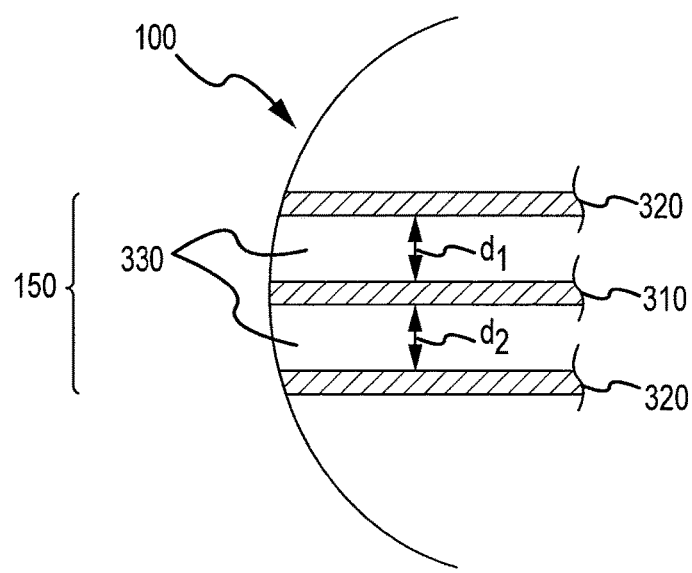
FIG. 3A depicts a cross sectional view of the remote control showing the capacitive sensors.
Figure 3B:
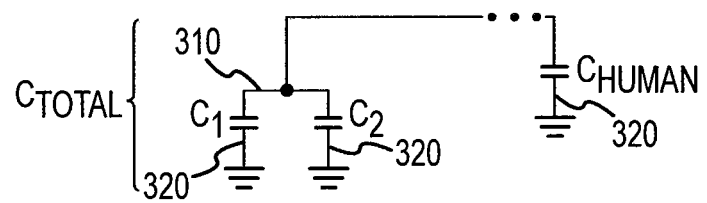
FIG. 3B shows a schematic representation of the capacitive sensor.

FIG. 3A represents a cross sectional view of the remote control 100, with the capacitive sensor 150 shown in detail. In one example, the capacitive sensor 150 includes a plurality of electrodes 310 and 320, such as one or more positive electrodes 310 as well as one or more negative electrodes 320. The positive and negative electrodes 310 and 320 are sandwiched between a dielectric 330. Note that the positive electrode 310 is separated from the negative electrodes 320 by distances $d_1$ and $d_2$. In some embodiments, distances $d_1$ and $d_2$ are equal to each other, although in other embodiments they may not be. FIG. 3B shows a schematic representation of the total capacitance $C_{TOTAL}$ of the capacitive sensor 150 from FIG. 3A with nodes 310 and 320 indicating the positive and negative connections. The total capacitance $C_{TOTAL}$ is equal to the contributions of $C_1$ and $C_2$ that correspond to distances $d_1$ and $d_2$ as shown in Equation (1), where A corresponds to the surface area that electrodes 310 and 320 have in common and ε reflects the dielectric constant of the material 330.

$$C_{TOTAL} = \varepsilon A \left( \frac{d_1 + d_2}{d_1 \cdot d_2} \right) \quad \text{Eq. (1)}$$

Note that in the event that the distances $d_1$ and $d_2$ are not equal and/or different materials with different dielectric constants are used in the gaps between the positive and negative electrodes 310 and 320, then separate dielectric constants $\varepsilon_1$ and $\varepsilon_2$ may be reflected in the calculation as shown in Equation (2), below. In such a case, $\varepsilon_1$ reflects the dielectric constant of the material in the distance $d_1$, and $\varepsilon_2$ reflects the dielectric constant of the material in the distance $d_2$. In some embodiments, the value of $C_{TOTAL}$ is tuned by varying the thickness of the dielectrics of the material 330—i.e., modifying distances $d_1$ and $d_2$. For example, redundant electrodes may be implemented in place or in addition to either electrodes 310 or 320, and during operation the value of $C_{TOTAL}$ is tuned by selectively coupling in and out these redundant electrodes.

$$C_{TOTAL} = A \left( \frac{\varepsilon_2 \cdot d_1 + \varepsilon_1 \cdot d_2}{d_1 \cdot d_2} \right) \quad \text{Eq. (1)}$$

Referring still to FIG. 3B, a capacitor $C_{HUMAN}$ schematically represents the capacitance resulting from a user picking up the remote control 100. Capacitor $C_{HUMAN}$ generally has a value less than 300 pF, although in some implementations, this value is much smaller. It should be recognized that regardless of the implementation specific size of $C_{HUMAN}$, $C_{HUMAN}$ relates to an expected capacitance value associated with the user holding the remote control 100.

Figure 3C:
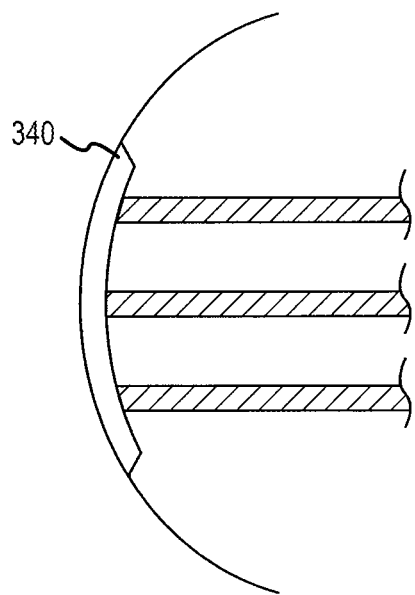
FIG. 3C represents the cross sectional view of the remote control from FIG. 3A, including an overlay.

Referring again to FIG. 3A, the capacitive sensor 150 may be implemented in a variety of forms, including as traces on either rigid circuit boards or flexible circuit boards. Regardless of whether the capacitive sensor 150 is implemented on rigid or flexible circuit boards or in another fashion, the positive and negative electrodes 310 and 320 may be maintained substantially parallel such that the separation distances $d_1$ and $d_2$ remain constant over the separation area A. In some embodiments, the positive and negative electrodes 310 and 320 are implemented in unused space along the circuit board housing additional electrical components of the remote control 100. Additionally, in some embodiments, the capacitive sensor 150 running along the periphery of the remote control may be covered by an overlay 340 (see FIG. 3C) to protect the positive and negative electrodes 310 and 320. FIG. 3C represents the cross sectional view of the remote control from FIG. 3A, including an overlay. The overlay 340 may be any variety of material, such as plastic or glass, and Equations (1) and (2) would be modified accordingly to reflect the new value for $C_{TOTAL}$ accounting for the dielectric of overlay 340.

Figure 4:
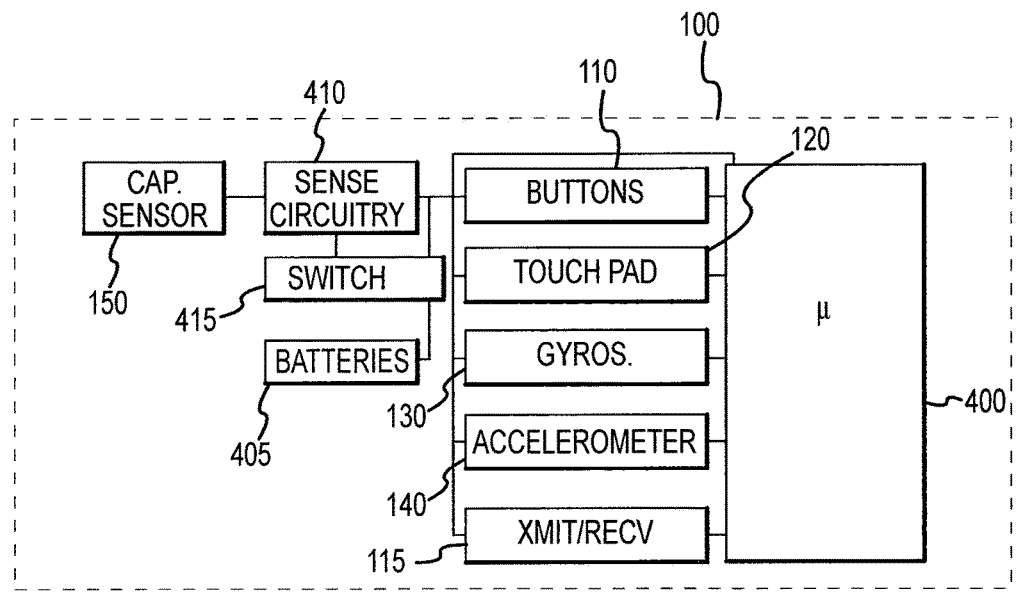
FIG. 4 depicts a block diagram of the remote control.

FIG. 4 is a block diagram of the remote control 100 according to some embodiments. As shown, the remote control includes a microprocessor 400 that couples to the buttons 110, the touch pad 120, the gyroscopes 130, the accelerometers 140, the transmitter/receiver block 115, the capacitive sensor 150, batteries 405 and sensing circuitry 410. During operation, the microprocessor 400 transmits and receives signals to these system components and enables one or more of them to enter a low power state depending upon readings from the capacitive sensor 150. The low power state may include selectively decoupling one or more of the touch pad 120, the gyroscopes 130, and/or the accelerometers 140 from the batteries 405, while still allowing the microprocessor 400 to be coupled to the batteries 405. In this manner, the microprocessor 400 may receive indications from the capacitive sensor 150 as to whether a user is holding the remote control 100.

Alternatively, instead of microprocessor 400, a switch 415 (such as a single transistor) may be used to shut down any portion of remote control 100 based on the presence of a predetermined capacitance. Another alternative is that a device may have an enable/disable function that can be controlled by the sense circuitry 410. In yet another alternative, power to the remote control 100 may be provided via a voltage regulator in the event that the power required by the remote control does not match the power provided by the batteries 405. Accordingly, the switch 415 may be coupled to an enable/disable function of such a regulator instead of the batteries 405. In still other embodiments, during low power mode, the microprocessor 400 may adjust the frequency of communication between the transmitter/receiver block 115 and the device that the remote control 100 is controlling, or alternatively, the information communicated between the remote control 100 and the device that the remote control 100 is controlling.

Figure 5:
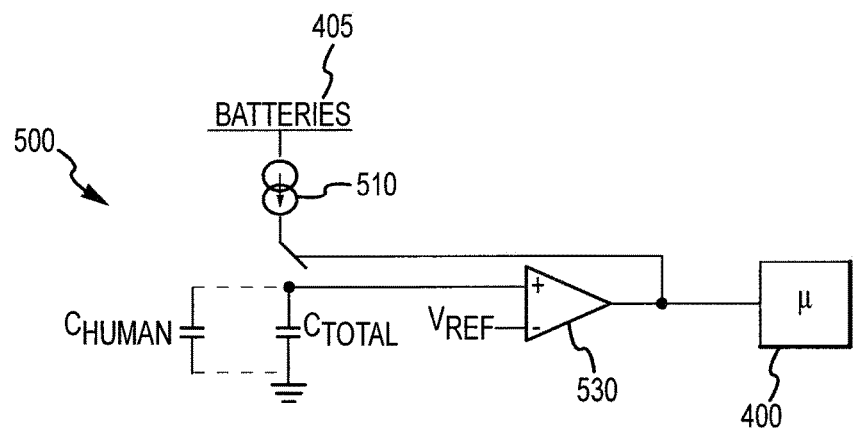
FIG. 5 illustrates an exemplary detection circuit.

FIG. 5 illustrates one of the many exemplary detection circuits that may be implemented as sense circuitry 410. The exemplary circuit 410 includes a current source 510 that couples to a power source, which in the case of the remote control 100 is the batteries 405. The current source 510 couples to the capacitance shown in FIG. 3B, $C_{TOTAL}$ and optionally $C_{HUMAN}$ when present, through a switch 520 that is controlled by an amplifier 530. In some embodiments, the amplifier 530 is incorporated within the microcontroller 400. The amplifier 530 has a negative terminal coupled to a reference voltage $V_{REF}$ and a positive terminal coupled to $C_{TOTAL}$ (and optionally $C_{HUMAN}$, when present). The output of the amplifier 530 controls the switch 520 to provide negative feedback and maintain the voltage at the positive terminal of the amplifier at $V_{REF}$. In the event that a user is holding the remote control 100, the capacitance $C_{HUMAN}$ is present and $C_{HUMAN}$ is electrically in parallel with $C_{TOTAL}$, which increases the value of the capacitance at the positive node of the amplifier 530. Increasing the capacitance at the positive terminal of the amplifier 530 decreases the overall voltage. The amplifier 530 provides negative feedback by regulating switch 520 to allow more current to flow in the combination of $C_{TOTAL}$ and $C_{HUMAN}$. This, in turn, increases the voltage at the positive terminal of the amplifier 530 until it equals the voltage $V_{REF}$ again. The microprocessor (from FIG. 4) also couples to output of the amplifier 530 to monitor whether the amplifier 530 is taking action to correct for the presence of $C_{HUMAN}$. The microprocessor 400 may perform various signal processing tasks on this data, including determining whether a user is holding the remote 100, debouncing the circuit 410, and/or re-calibrating $C_{TOTAL}$ by using the redundant connections described above.

Figure 6:
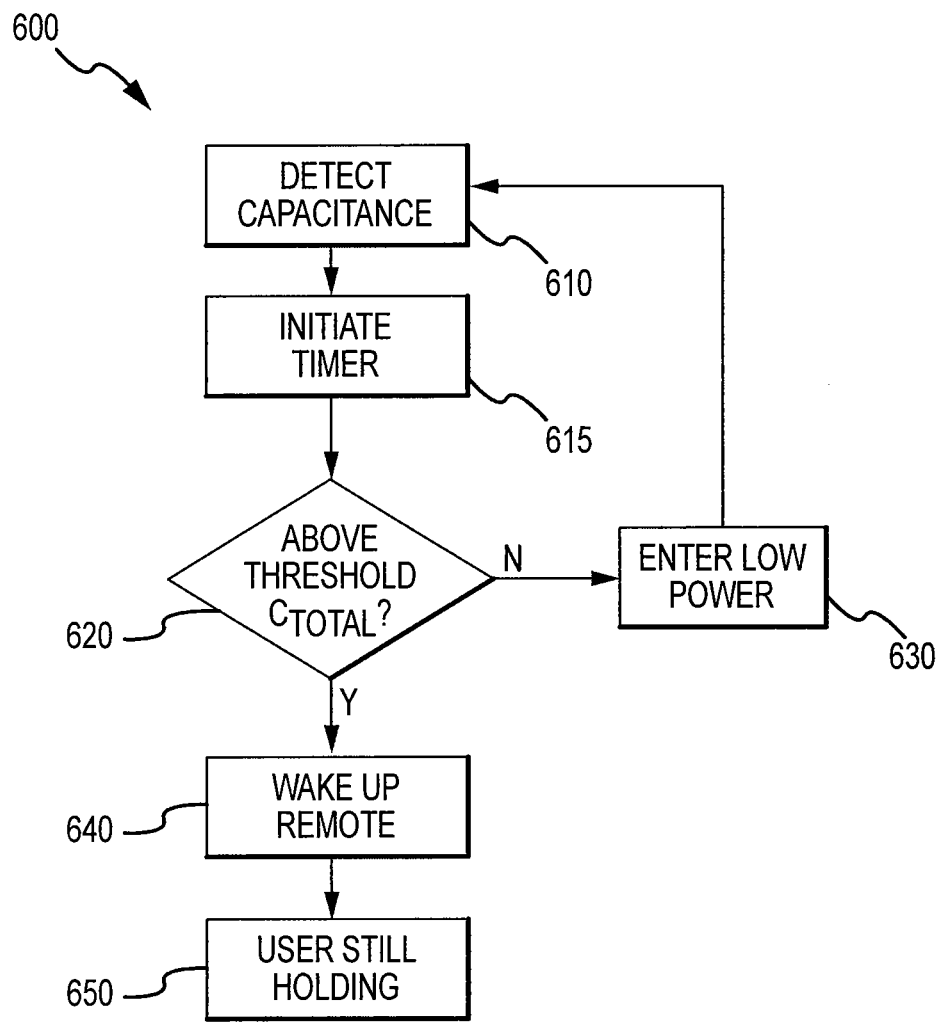
FIG. 6 represents an algorithm performed by the remote control.

FIG. 6 illustrates an exemplary algorithm 600 implemented by the remote control 100 according to some embodiments. In block 610, the capacitive sensor 150 determines if someone is holding the remote control 100. The acts performed in block 610 may be performed using the circuitry 410 shown in FIG. 5. In block 615, a timer is initiated. The timer may be initiated from within the microprocessor 400, or elsewhere using specialized timer circuitry. This timer may be initialized each time a user has moved the remote control. With the capacitance measured from block 610, the microprocessor 400 may then determine, in decision block 620, whether the capacitance is equal to or below $C_{TOTAL}$ (i.e., the user is not holding the remote control 100) or greater than this value (i.e., the user is holding the remote control 100). If the capacitance has not changed and still equals $C_{TOTAL}$, the microprocessor may cause the remote control 100 to enter a low power mode by powering down one or more of the power intensive modules as shown in block 630. For example, the gyroscopes 130 and/or accelerometers 140 may be powered down. If, on the other hand, the capacitance has changed and now exceeds $C_{TOTAL}$ (e.g., $C_{HUMAN}$ has been added to the standard capacitance) the microprocessor may cause the remote control 100 to wake up from a low power mode as shown in block 640. This may include waking up one or more of the modules previously powered down in block 630. In one embodiment, the time it takes to wake up the remote control 100 from the low power mode may be less than or equal to 100 milliseconds. In block 650, if the user has been holding the remote control 100 for an extended period of time without movement, then the microprocessor may direct the sense circuitry to enter a low power state. For example, the sense circuitry 410 may be directed to power down every 50 milliseconds if the timer indicates no movement of the remote control.

The frequency with which algorithm 600 is executed by the remote control 100 may vary based on the operational state of the remote control 100. For example, if the remote control 100 is in a low power mode algorithm 600 may be executed less frequently (based on value of initiated timer) than if the remote control 100 is "woken up".

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A remote control device, comprising:
a housing;
a power source;
a transmitter that outputs control signals for remotely controlling an electronic device, the transmitter being operable to selectively output the control signals at a first communication frequency and at a second communication frequency;
a sensor coupled to the housing, the sensor being configured to sense whether a user is holding the housing and output a sense signal indicating whether the user is holding the housing; and
a processor coupled to the power source, the transmitter and the sensor, the processor being configured to initiate a low power mode when the sense signal indicates the user is not holding the housing, and to cause the transmitter to output the control signals at the second communication frequency in the low power mode, wherein the second communication frequency is a lower frequency than the first communication frequency.

2. The remote control device of claim 1, further comprising an electronic component within the housing and configured to control an operation of the remote control device, the electronic component being operatively coupled to the power source, wherein the processor is further configured to decouple power from the power source to the electronic component in the low power mode.

3. The remote control device of claim 2, wherein the electronic component includes at least one of: an accelerometer, a gyroscope, and a touchpad.

4. The remote control device of claim 2, further comprising a switch, the electronic component being operatively coupled to the power source through the switch.

5. The remote control device of claim 1, wherein the sensor includes a capacitive sensor.

6. The remote control device of claim 5, wherein the capacitive sensor is positioned along a periphery of the housing.

7. The remote control device of claim 1, further comprising a motion sensor configured to detect a movement of the remote control device, the motion sensor being coupled to the processor, wherein the processor is configured to initiate the low power mode in response to the motion sensor detecting that the remote control device has not been moved for a predetermined period of time, even if the sensor senses that the user is holding the remote control device.

8. The remote control device of claim 1, further comprising a screen, wherein the user's movement of the remote control device corresponds to moving one or more user selection devices on the screen.

9. A method, comprising:
sensing, by a sensor in a remote control device, whether a user is holding the remote control device;
generating, by the sensor, a sense signal indicating whether the user is holding the remote control device;
initiating a low power mode, by a processor of the remote control device, based on the sense signal; and
adjusting, by the processor, a communication frequency of a transmitter/receiver module in the remote control device in the low power mode.

10. The method of claim 9, further comprising:
detecting, by a motion sensor, a movement of the remote control device; and
initiating the low power mode in response to the motion sensor detecting that the remote control device has not been moved for a predetermined period of time.

11. A method comprising:
sensing, by a sensor in a remote control device, whether a user is holding the remote control device, wherein sensing whether the user is holding the remote control device includes
detecting a capacitance by the sensor; and
comparing the capacitance to a threshold capacitances;
generating, by the sensor, a sense signal indicating whether the user is holding the remote control device;
initiating a low power mode, by a processor of the remote control device, based on the sense signal;
adjusting, by the processor, a communication frequency of a transmitter/receiver module in the remote control device in the low power mode; and
decoupling power from the power source to an electronic component in the remote control device in the low power mode.

12. A method of comprising:
sensing, by a sensor in a remote control device, whether a user is holding the remote control device; wherein the sensing whether a user is holding the remote control device includes
detecting a capacitance by the sensor; and
comparing the capacitance to a threshold capacitance;
generating, by the sensor, a sense signal indicating whether the user is holding the remote control device, wherein generating the sense signal includes generating a sense signal indicating that the user is holding the remote control device if the detected capacitance exceeds the predetermined threshold capacitance;
initiating a low power mode, by a processor of the remote control device, based on the sense signal;
adjusting, by the processor, a communication frequency of a transmitter/receiver module in the remote control device in the low power mode; and
decoupling power from the power source to an electronic component in the remote control device in the low power mode.

13. A system, comprising:
a set top box; and
a remote control device configured to remotely control the set top box, the remote control device including:
a power source;
a processor coupled to the power source; and
a sensor configured to sense whether a user is holding the remote control device and to output to the processor a signal indicating whether the user is holding the remote control device,
wherein the processor is configured to initiate a low power mode when the signal indicates the user is not holding the remote control device, and to adjust a frequency of communication between the remote control device and the set top box in the low power mode.

14. The system of claim 13, wherein the remote control device further includes a motion sensor configured to detect a movement of the remote control device, the motion sensor being coupled to the processor, wherein the processor is configured to initiate the low power mode in response to the motion sensor detecting that the remote control device has not been moved for a predetermined period of time, even if the sensor senses that the user is holding the remote control device.

15. The system of claim 13, wherein the sensor of the remote control device includes a capacitive sensor.

16. The system of claim 13, wherein the remote control device further includes an electronic component within the housing and configured to control an operation of the remote control device, the electronic component being operatively coupled to the power source, wherein the processor is further configured to decouple power from the power source to the electronic component based on the low power mode signal.

17. The system of claim 16, wherein the electronic component includes at least one of: an accelerometer, a gyroscope, and a touchpad.

18. The system of claim 16, wherein the remote control device further includes a switch, the electronic component being operatively coupled to the power source through the switch.

* * * * *